US006956719B2

(12) United States Patent
Mundt et al.

(10) Patent No.: US 6,956,719 B2
(45) Date of Patent: Oct. 18, 2005

(54) SELF-CORRECTING DISC HEAD SLIDER (75) Inventors: Michael David Mundt, Longmont, CO (US); James Morgan Murphy, Boulder, CO (US)

(73) Assignee: Seagate Technology LLC, Scotts Valley, CA (US)

( * ) Notice: Subject to any disclaimer, the term of this patent is extended or adjusted under 35 U.S.C. 154(b) by 356 days.

(21) Appl. No.: 10/175,937

(22) Filed: Jun. 20, 2002

(65) Prior Publication Data
US 2003/0053253 A1 Mar. 20, 2003

Related U.S. Application Data
(60) Provisional application No. 60/322,310, filed on Sep. 12, 2001.

(51) Int. Cl.[7] ............................................. G11B 17/32
(52) U.S. Cl. .................................................. 360/236.3
(58) Field of Search ........................... 360/236.3, 235.5, 360/235.6, 235.8

(56) References Cited

U.S. PATENT DOCUMENTS

| 5,327,311 A | * | 7/1994 | Ananth et al. ............ 360/235.6 |
| 5,940,249 A | | 8/1999 | Hendriks ..................... 360/103 |
| 6,137,656 A | | 10/2000 | Levi et al. ................ 360/235.4 |
| 6,157,519 A | | 12/2000 | Kohira et al. ................ 360/245 |
| 6,160,683 A | | 12/2000 | Boutaghou ................ 360/237.1 |
| 6,230,380 B1 | | 5/2001 | Wang et al. ................ 29/90.01 |
| 6,236,543 B1 | | 5/2001 | Han et al. ................ 360/236.6 |
| 6,296,552 B1 | | 10/2001 | Boutaghou et al. ........... 451/41 |
| 6,424,493 B1 | * | 7/2002 | Matsumoto et al. ..... 360/235.5 |
| 2003/0184915 A1 | * | 10/2003 | Kameyama et al. ..... 360/235.8 |

* cited by examiner

Primary Examiner—Tianjie Chen
(74) Attorney, Agent, or Firm—Westman, Champlin & Kelly, P.A.

(57) ABSTRACT

A disc head slider supports a transducer relative to a moving media in a data storage system. The slider includes a slider body having a media opposing face with a leading slider edge, a trailing slider edge, a recessed area and a bearing surface formed by at least one positive pressurization area. The pressurization area is raised relative to the recessed area. A wearable airflow-blocking pad is positioned upstream of the positive pressurization area, between the positive pressurization area and the recessed area. The pad is wearable from a first height to a second, lower height relative to the positive pressurization area during normal operation of the data storage system. The airflow-blocking pad substantially disrupts fluid flow from reaching the positive pressurization area when at the first height and allows progressively increasing fluid flow to reach the positive pressurization area as the pad wears toward the second height.

23 Claims, 7 Drawing Sheets

SELF-CORRECTING DISC HEAD SLIDER

CROSS-REFERENCE TO RELATED APPLICATION

This application claims priority from U.S. Provisional Application No. 60/322,310 filed on Sep. 12, 2001 for inventors Michael David Mundt and James Morgan Murphy and entitled SELF-CORRECTING AAB DESIGN.

FIELD OF THE INVENTION

The present invention relates generally to disc drive data storage systems, and more particularly but not by limitation to a disc drive data storage system having a slider with air flow blocking pads which are located upstream from key pressurization features and are designed to wear over time.

BACKGROUND OF THE INVENTION

Disc drives of the "Winchester" type are well known in the industry. Such drives use rigid discs, which are coated with a magnetizable medium for storage of digital information and a plurality of circular, concentric data tracks. The discs are mounted on a spindle motor, which causes the discs to spin and the surfaces of the disc to pass under respective hydrodynamic (e.g., air) bearing disc head sliders. The sliders carry transducers, which write information to and read information from the disc surfaces.

An actuator mechanism moves the sliders from track to track across the surfaces of the discs under control of electronic circuitry. The actuator mechanism includes a track accessing arm and a suspension for each head gimbal assembly. The suspension includes a load beam and a gimbal. The load beam provides a load force, which forces the slider towards the disc surface. The gimbal is positioned between the slider and the load beam to provide a resilient connection that allows the slider to pitch and roll while following the topography of the disc. Alternatively, the gimbal can be integrated with the load beam as a single, continuous piece of material.

The slider includes a bearing surface, which faces the disc surface. As the disc rotates, the disc drags air under the slider and along the bearing surface in a direction approximately parallel to the tangential velocity of the disc. As the air passes beneath the bearing surface, air compression along the air flow path causes the air pressure between the disc and the bearing surface to increase which creates a hydrodynamic lifting force that counteracts the load force, and causes the slider to lift and fly above or in close proximity to the disc surface. One type of slider is a "self-loading" air bearing slider, which includes a leading taper or step, a pair of raised side rails, a cavity dam and a sub-ambient pressure cavity. The leading taper or step is typically lapped or etched onto the end of the slider that is opposite to the recording head. The leading taper pressurizes the air as the air is dragged under the slider by the disc surface. An additional effect of the leading taper is that the pressure distribution under the slider has a peak near the taper end or leading edge due to a high compression angle of the taper, and has a second peak near the recording end or trailing edge due to a low bearing clearance for efficient magnetic recording. This dual peak pressure distribution results in a bearing with a high pitch stiffness.

Some disc head sliders have included diamond-like carbon ("DLC") pads which are formed on top of the rails to mitigate friction between the slider and the disc surface during the start and stop of disc rotation, known as contact-start-stop (CSS). Further, the DLC pads have been placed on the slider in tribologically advantageous locations to increase the relative strength of the slider. However, current DLC pads have played no role in controlling the pressurization of the air bearing surface during normal operation.

The bearing clearance between the slider and the disc surface at the recording head is an important parameter to disc drive performance. It is desired to minimize variation in head clearance or flying height. As average flying heights continue to be reduced, it is important to control several metrics of flying height performance, such as flying height sensitivity to process variations, ambient pressure (e.g., altitude) variations, changes in radial position of the slider over the disc surface and resulting head skew, and quick movements of the slider from one radial position to another radial position. In addition, it is becoming increasingly more difficult to achieve this lower fly height due to inherent limitations of slider and media process consistency. Improved slider designs are therefore desired that can account for these inherent process limitations while providing very low and stable flying heights.

Embodiments of the present invention provide solutions to these and other problems, and offer other advantages over the prior art.

SUMMARY OF THE INVENTION

One embodiment of the present invention is directed to a disc head slider which supports a transducer relative to a moving media in a data storage system. The slider includes a slider body having a media opposing face with a leading slider edge, a trailing slider edge, a recessed area and a bearing surface formed by at least one pressurization feature. The pressurization feature includes an upper surface with a positive pressurization area, which is raised relative to the recessed area. A wearable airflow-blocking pad is positioned on the media opposing face, upstream of the positive pressurization area and between the positive pressurization area and the recessed area. The pad has an upper surface that is wearable from a first height to a second, lower height relative to the upper surface of the pressurization feature during normal operation of the data storage system. The airflow-blocking pad has a location on the media-opposing face and a dimension such that the pad substantially disrupts fluid flow from reaching the positive pressurization area when at the first height and allows progressively increasing fluid flow to reach the positive pressurization area as the pad wears toward the second height.

Another embodiment of the present invention is directed to a disc drive. The disc drive includes a data storage disc, which is rotatable about a central axis, a suspension, and a slider. The slider is supported by the suspension relative to the data storage disc and includes a slider body having a disc opposing face with a leading edge and a trailing edge relative to a direction of rotation of the data storage disc. A recessed area is formed on the media opposing face. A positive pressurization area is formed on the media opposing face, downstream of the recessed area, wherein the positive pressurization area is raised relative to the recessed area. An airflow-blocking pad is disposed upstream from the positive pressurization area and is wearable from a first height to a second, lower height relative to the positive pressurization area during normal rotation of the data storage disc. The airflow-blocking pad substantially blocks fluid flow from pressurizing the positive pressurization area when at the first height, causing contact between the airflow-blocking pad and the disc. The airflow-blocking pad allows progressively increasing fluid flow to reach and pressurize the positive pressurization area as the pad wears toward the second height due to the contact.

Yet another embodiment of the present invention is directed to a method for adjusting the fly height of a head slider relative to a moving media. The method includes supporting the slider relative to the media, wherein the slider has a media opposing face, a positive pressurization surface disposed on the media opposing face, and a recessed area formed within the media opposing face upstream of the positive pressurization surface, which is recessed from the positive pressurization surface. The media is moved relative to the slider body causing fluid flow along the media opposing face. An airflow-blocking pad blocks the fluid flow from reaching and providing any substantial pressurization to the positive pressurization surface. The pad is disposed on the media opposing face and has a first height relative to the positive pressurization surface, such that the airflow-blocking pad contacts the media as the media moves relative to the slider. The airflow-blocking pad burnishes as the pad contacts the media such that the pad wears from the first height toward a second, lower height and the fluid flow to the positive pressurization surface progressively increases. The rate of burnishing decreases toward zero as the airflow-blocking pad approaches the second height.

Other features and benefits that characterize embodiments of the present invention will be apparent upon reading the following detailed description and review of the associated drawings.

DETAILED DESCRIPTION OF ILLUSTRATIVE EMBODIMENTS

Figure 1:
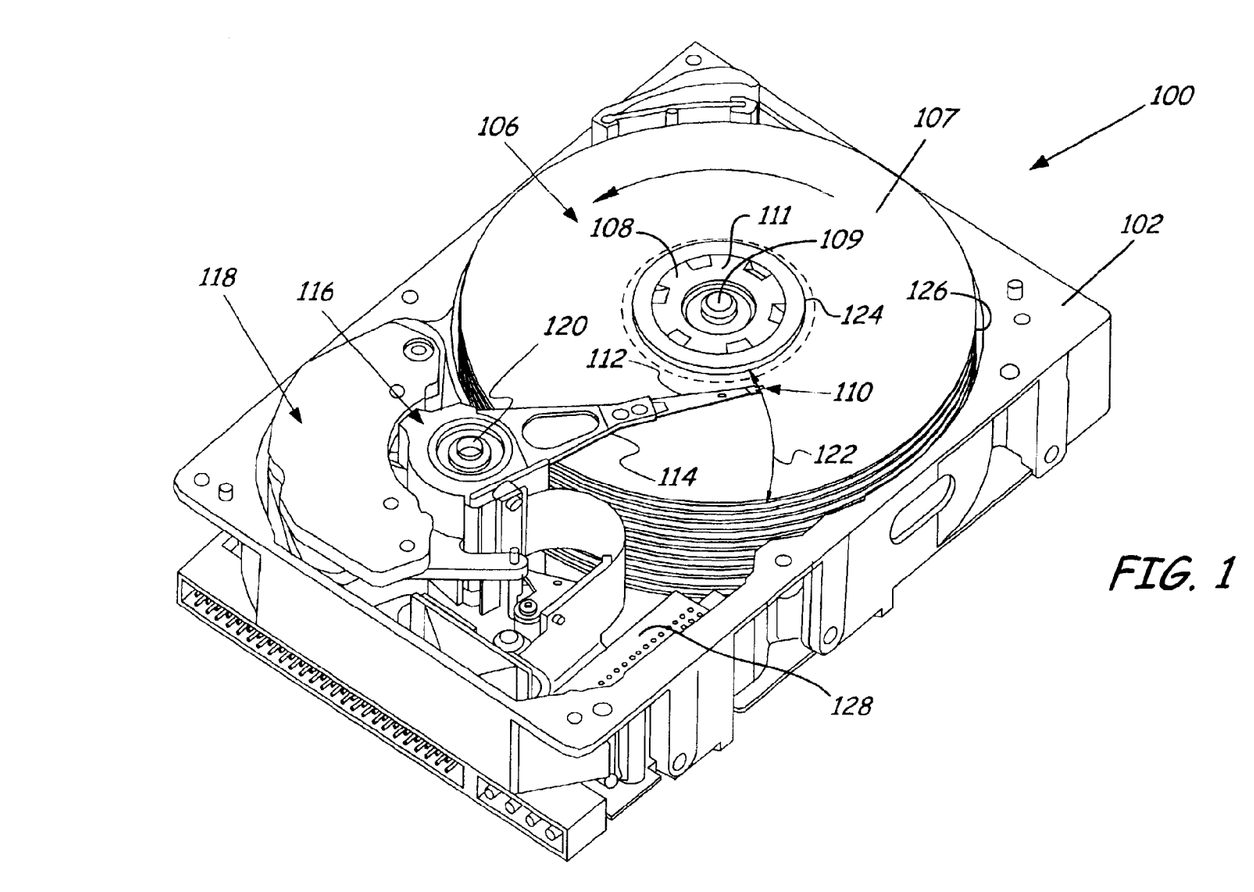
FIG. 1 is a perspective view of a disc drive.

FIG. 1 is a perspective view of disc drive 100 in which embodiments of the present invention are useful. The same reference numerals are used in the various figures to represent the same or similar elements. Disc drive 100 includes a housing with a base 102 and a top cover (not shown). Disc drive 100 further includes a disc pack 106, which is mounted on a spindle motor (not shown) by a disc clamp 108. Disc pack 106 includes a plurality of individual discs 107, which are mounted for co-rotation about a central axis 109. Each disc surface has an associated slider 110 which is mounted to disc drive 100 and carries a read-write head for communication with the disc surface. In the example shown in FIG. 1, sliders 110 are supported by suspensions 112 which are in turn attached to track accessing arms 114 of an actuator 116. The actuator shown in FIG. 1 is of the type known as a rotary moving coil actuator and includes a voice coil motor (VCM), shown generally at 118. Voice coil motor 118 rotates actuator 116 with its attached sliders 110 about a pivot shaft 120 to position sliders 110 over a desired data track along a path 122 between a disc inner diameter 124 and a disc outer diameter 126. Voice coil motor 118 operates under control of internal circuitry 128. Other types of actuators can also be used, such as linear actuators.

As discussed in more detail below, slider 110 has a hydrodynamic (e.g., air) bearing, which has features that initially block airflow to key pressurization areas on the slider and burnish-off over time to allow the slider to find an equilibrium flying height. These airflow-blocking features actively participate in the pressurization process as opposed to traditional "pads" or "bumps" used on some prior art sliders.

Figure 2:
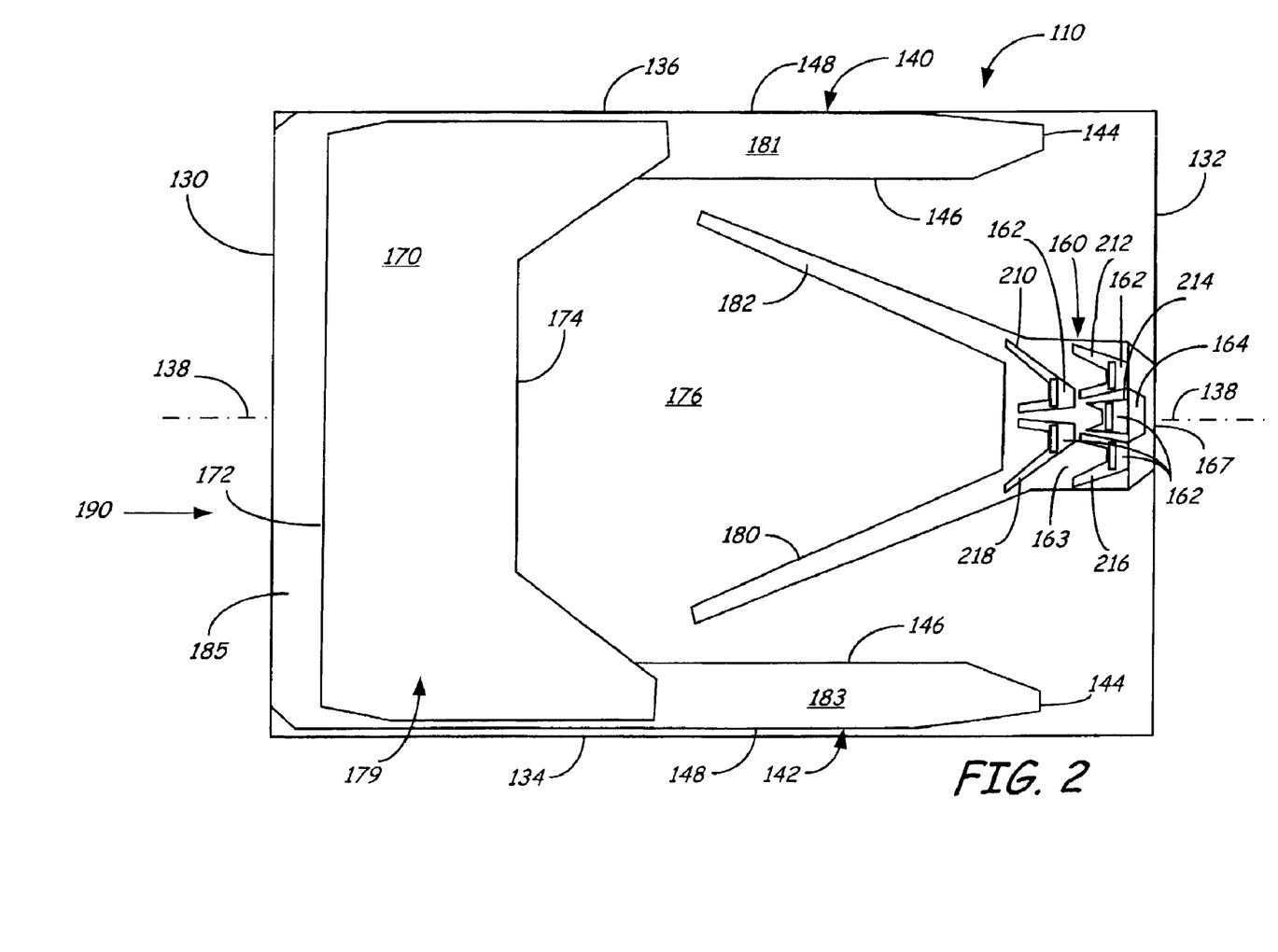
FIG. 2 is a bottom plan view of a slider in accordance with one embodiment of the present invention.

FIG. 2 is a bottom plan view of one of the sliders 110 in accordance with one exemplary embodiment of the present invention. Slider 110 has a slider leading edge 130, a slider trailing edge 132, raised side rails 140 and 142, a center pad 160, a cavity dam 170 and a subambient pressure cavity (or recessed area) 176. Slider side rails 140 and 142 are positioned along side edges 134 and 136, respectively. Rails 140 and 142 extend generally from leading slider edge 130 towards trailing slider edge 132. Each rail 140 and 142 has a trailing rail edge 144, an inside rail edge 146 and an outside rail edge 148. Rails 140 and 142 have recessed areas 181 and 183, respectively, which are recessed from cavity dam 170 by a step depth of 0.1 micrometers ($\mu$m) to 0.3 $\mu$m, for example, and are raised from subambient pressure cavity 176. Other depths can also be used. In another embodiment, rails 140 and 142 are coplanar with cavity dam 170.

Cavity dam 170 extends between side rails 140 and 142, along leading edge 130. Cavity dam 170 further includes an upper surface 179, which defines a portion of a bearing surface for slider 110. Cavity dam 170 has a leading edge 172 and a trailing edge 174. Cavity dam 170 and side rails 140 and 142 define subambient pressure cavity 176, which trails the cavity dam 170 relative to a direction of air flow (shown as arrow 190) from slider leader edge 130 to slider trailing edge 132. In one embodiment, subambient pressure cavity 176 is recessed from the upper surface 179 of cavity dam 170 by a "cavity depth" of 1 $\mu$m to 3 $\mu$m, for example. Again, other depths can also be used. A leading step surface 185 extends along leading slider edge 130, forward of leading edge 172 of cavity dam 170. Leading step surface 185 is recessed from the upper surface 179 of cavity dam 170 by the step depth, for example. In one embodiment, leading step surface 185 and recessed areas 181 and 183 are generally parallel to upper surface 179. Alternatively, leading step surface 185 can be formed as a leading taper.

A raised center pad 160 is positioned along slider trailing edge 132 and is centered along a lateral centerline 138. However, center pad 160 and one or more of side rails 140 and 142 can be asymmetrical with respect to centerline 138 in alternative embodiments. Center pad 160 has a bearing surface 162, a step surface 163, a leading edge 165, a trailing edge 167, and a pair of funnel arms 180 and 182. Center pad 160 supports a read write transducer 164. The bearing surface 162 is formed by the upper surfaces of a plurality of discrete pressurization features 210, 212, 214, 216 and 218, which are generally coplanar with the upper surface 179 of cavity dam 170. Step surface 163 is recessed from bearing surface 162 by the step depth, for example. Funnel arms 180 and 182 extend away from center pad 160 towards slider leading edge 130 and are at the same height as the step surface 163. Funnel arms 180 and 182 diverge from one another as they extend from a main body portion of center pad 160 and terminate prior to reaching cavity dam 170 and side rails 140 and 142. Funnel arms 180 and 182 extend into the subambient pressure cavity 176 and form a funnel-like shape, which directs fluid flow from cavity 176 towards center pad 160 for assisting the pressurization of features 210, 212, 214, 216 and 218. Funnel arms 180 and 182 connect to center pad 160 at center pad leading edge 165.

Figure 3:
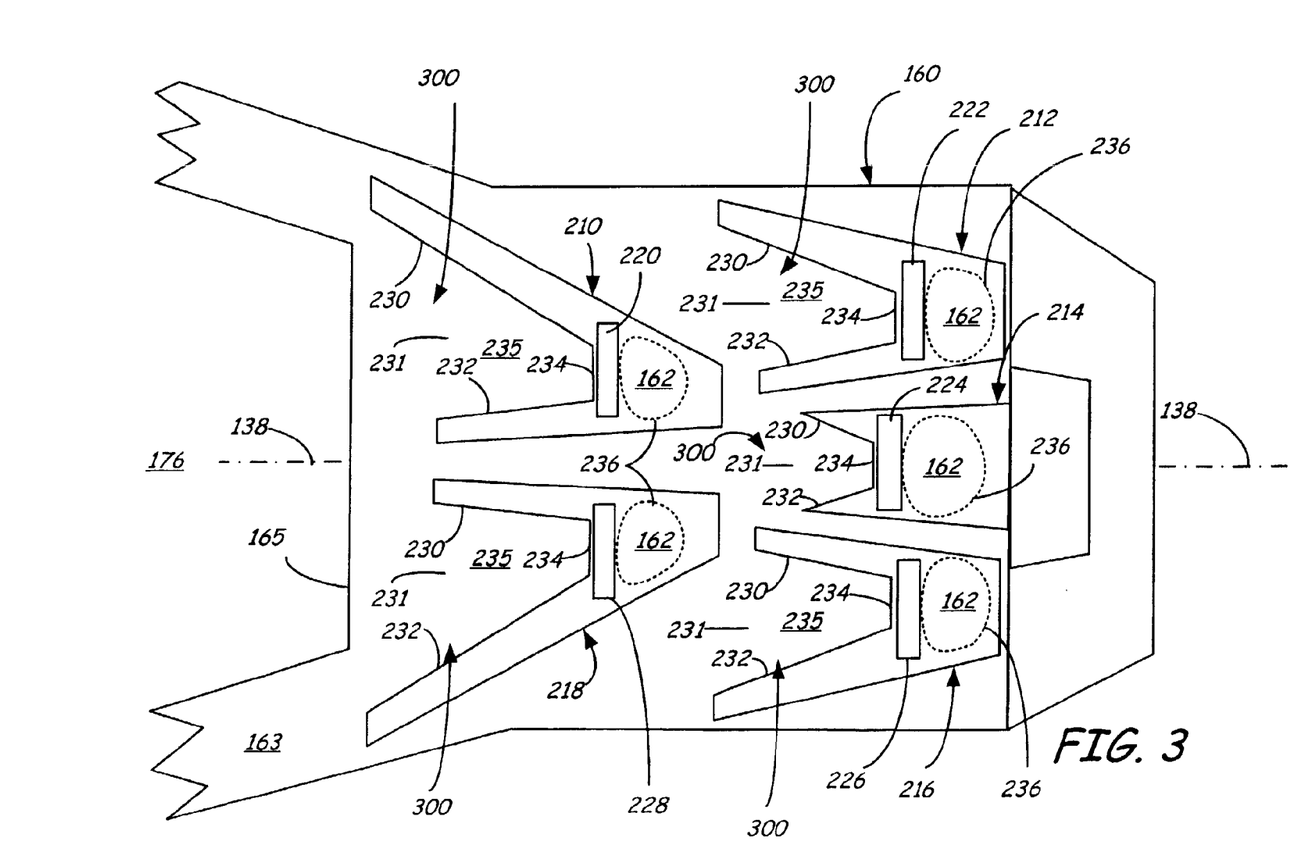
FIG. 3 is an enlarged view of the center pad of the slider in FIG. 2.
Figure 4:
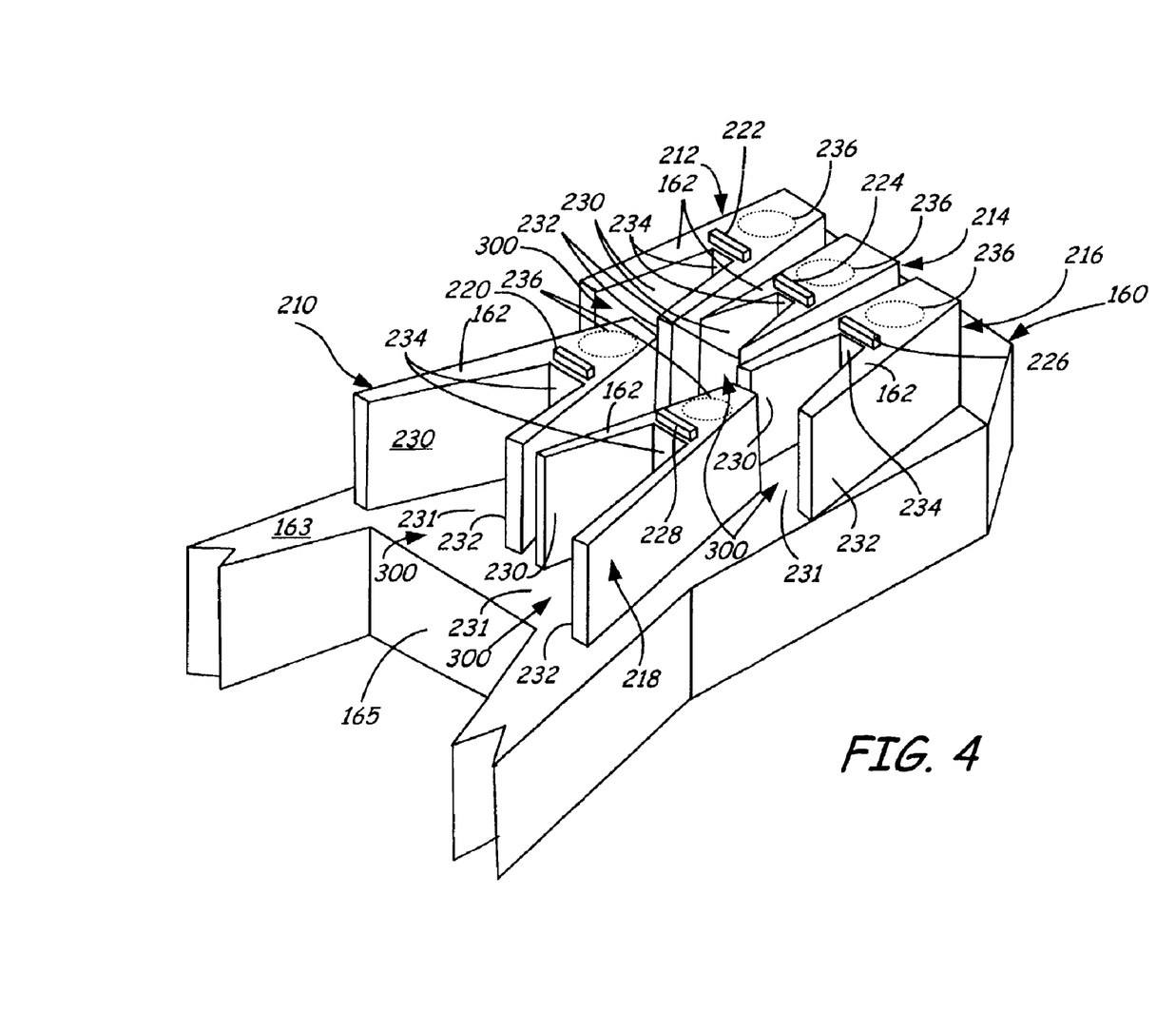
FIG. 4 is a perspective view of the center pad in FIG. 3.

FIG. 3 is an enlarged view of the main body portion of center pad 160 as shown in FIG. 2, which shows pressurization features 210, 212, 214, 216 and 218 in greater detail. FIG. 4 is a perspective view of center pad 160 as shown in FIG. 3. Each pressurization feature 210, 212, 214, 216 and 218 has a convergent channel 300, which is recessed within bearing surface 162 and trails a portion of subambient pressure cavity 176. Channels 300 each have a leading channel end 231, channel side walls 230 and 232, a trailing channel end 234 and a channel floor 235.

Channels 300, are formed through photolithography processes such as ion milling, chemical etching or Reactive Ion Etching (RIE). With these processes, the depth and location of the channels can be accurately controlled. In one embodiment, channel floors 235 are coplanar and contiguous with recessed center pad surface 163. However, channel floors 235 can have other depths relative to bearing surfaces 162, which are either greater than or less than the depth of surface 163. Also, channel floors 235 can have various vertical profiles, such as a tapered profile.

Leading channel end 231 is open to fluid flow from cavity 176, and trailing channel end 234 is closed to the fluid flow. A portion of the fluid flow from cavity 176 is directed into channels 300. Once the fluid flow enters channels 300, the flow is essentially bounded by side walls 230 and 232 and trailing end 234 and is forced to exit the channels over trailing channel ends 234. This creates localized positive pressure areas 236 rearward of trailing channel ends 234. The ability to control the location of the pressure rise allows the slider designer more freedom with the remainder of the bearing geometry, which can result in significant design improvements.

In the example shown in FIG. 3 and FIG. 4, pressurization features 210, 212, 214, 216 and 218 have a horseshoe shape. Side walls 230 and 232 diverge from one another as they extend forward from trailing channel end 234 so as to direct as much of the local fluid flow into the channel as possible. However, pressurization features 210, 212, 214, 216 and 218 can have any alternative shape that creates increased pressurization as the fluid flow flows over the positive pressure areas 236. The channel side walls 230 and 232 can be parallel to one another, diverge from one another or converge toward one another. The overall shape of the feature can be a horseshoe as in FIGS. 3 and 4 or can have any other suitable shape, such as rectangular. Furthermore, there can be any number of pressurization features on center pad 160.

Center pad 160 further includes airflow-blocking pads 220, 222, 224, 226, and 228, which are placed slightly upstream of respective ones of the positive pressurization areas 236. In the example shown in FIGS. 3 and 4, airflow-blocking pads 220, 222, 224, 226, and 228 are formed on bearing surfaces 162. However, airflow-blocking pads 220, 222, 224, 226, and 228 can be formed on other surfaces, such as on channel floors 235. Airflow-blocking pads 220, 222, 224, 226, and 228 have upper surfaces which extend vertically beyond bearing surfaces 162 towards the disc surface. Airflow-blocking pads 220, 222, 224, 226 and 228 can be formed by an additive or a subtractive process. In one embodiment, the pads are formed of a diamond-like carbon (DLC) material, which is different from the slider body substrate material. Other materials can also be used. In another embodiment, the pads are formed from the slider body substrate material.

Airflow-blocking pads 220, 222, 224, 226 and 228 are sized with respect to the widths and heights of the pads to disrupt substantially all of the local fluid flow directed towards the positive pressure areas 236 of the associated pressurization features 210, 212, 214, 216 and 218. In one embodiment, pads 220, 222, 224, 226 and 228 have initial heights of at least 250 Angstroms relative to bearing surfaces 162. Other heights can also be used. In one embodiment, the widths of airflow-blocking pads 220, 222, 224, 226 and 228 exceed 50 percent of the widths of their respective pressurization areas 236, as measured in a direction transverse to center line 138 in FIG. 1. In another embodiment, the widths of the airflow-blocking pads exceed 75 percent of the widths of pressurization areas 236. In yet another embodiment, the widths of the airflow-blocking pads exceed 85 percent of the widths of pressurization areas 236.

When slider 110 includes one or more of the airflow-blocking pads 220, 222, 224, 226 and 228 as described above, the slider will exhibit flying characteristics that differ substantially from a typical slider during the break-in period of the disc drive. A typical slider tends to pressurize fully almost immediately after disc spin-up, and begins to fly at its designed fly height.

With the embodiment shown in FIGS. 3 and 4, airflow-blocking pads 220, 222, 224, 226 and 228 act to disrupt substantially the fluid flow flowing over pressurization features 210, 212, 214, 216 and 218 and block that flow from reaching the associated positive pressurization areas 236. As a result, these areas 236 are not able to pressurize fully. This disruption of the pressurization results in slider 110 exhibiting initial head/disc contact. Slider 110 and transducer 164 initially fly at a flying height that is significantly lower than its designed fly height. This is because slider 110 does not fully pressurize to counteract the preload force supplied by the suspension. As the break-in period continues, airflow-blocking pads 220, 222, 224, 226 and 228 burnish or "wear" from a first, initial height to a second, lower height relative to bearing surfaces 162 due to contact between the airflow-blocking pads 220, 222, 224, 226 and 228 and the disc surface.

As the airflow-blocking pads 220, 222, 224, 226 and 228 wear, an increasing amount of the local fluid flow from channels 300 reaches the associated positive pressure areas 236 resulting in an increase in the pressurization of slider 110. This in-turn increases the flying height of transducer 164 and slider 110 until the slider no longer contacts the disc surface. The increased pressurization further acts to reduce the rate at which the airflow-blocking pads burnish. Airflow-blocking pads 220, 222, 224, 226 and 228 continue to burnish at a reducing rate until the burnishing rate reaches zero. Thus, an asymptotic, critical equilibrium state is reached in which the burnishing rate equals zero and slider 110 flies in close proximity to the disc surface at the desired flying height. Airflow-blocking pads 220, 222, 224, 226 and 228 are thus "wearable" in that they wear from the first height to the second height during normal operation of the disc drive.

This structure and function is in contrast to those of traditional DLC pads, which serve only to aid tribologically rather than play an active role in the bearing pressurization process, as in various embodiments of the present invention.

Figure 5:
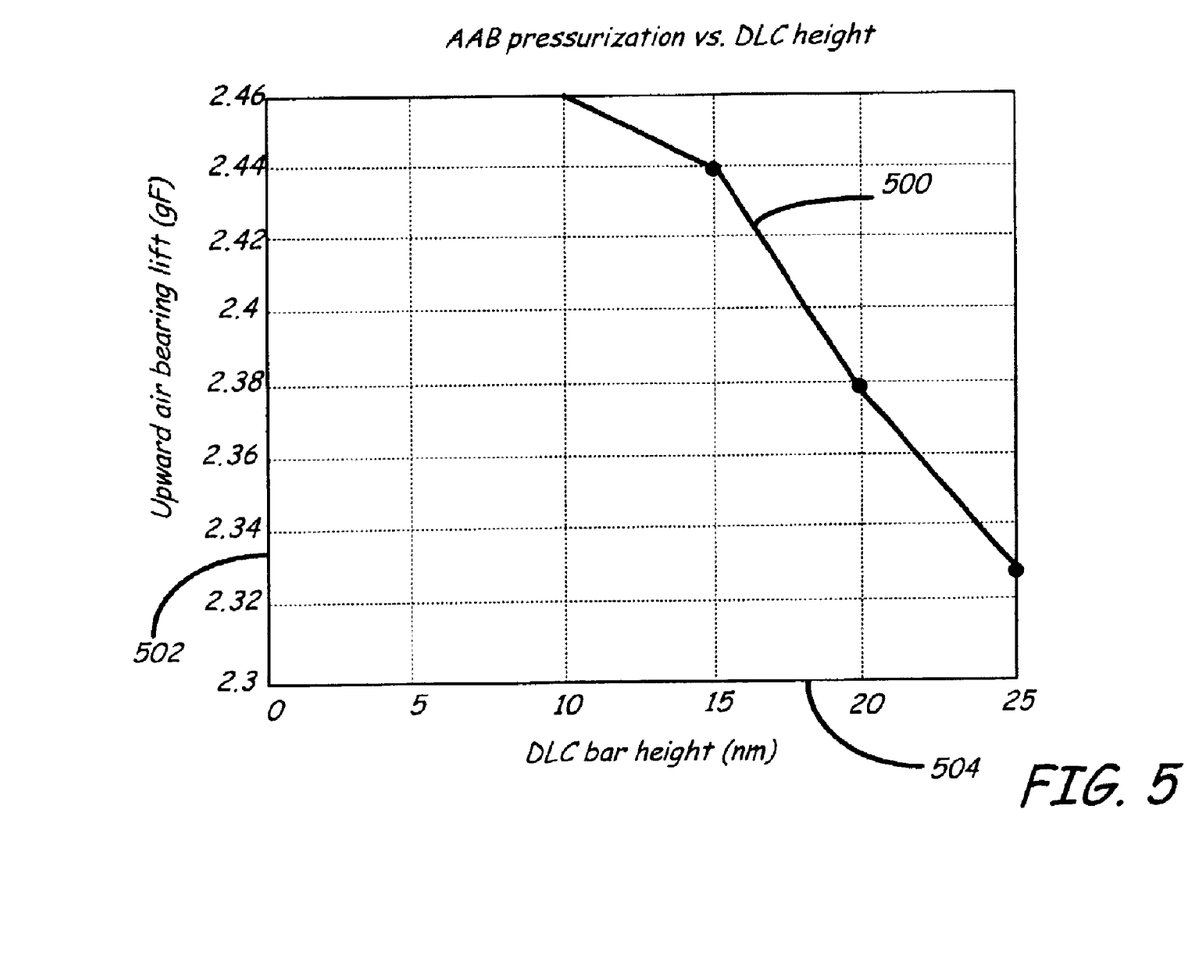
FIG. 5 is a graph of a pressurization curve of the slider in FIG. 2.

FIG. 5 shows a pressurization curve 500 of slider 110 as a function of the airflow-blocking pad height. Vertical axis 502 represents the upward lifting force generated by the bearing in grams force, and horizontal axis 504 represents the height of the airflow-blocking pads in nanometers. Curve 500 shows that as the height of the pads decreases due to burnishing the pressurization of the bearing increases.

Figure 6:
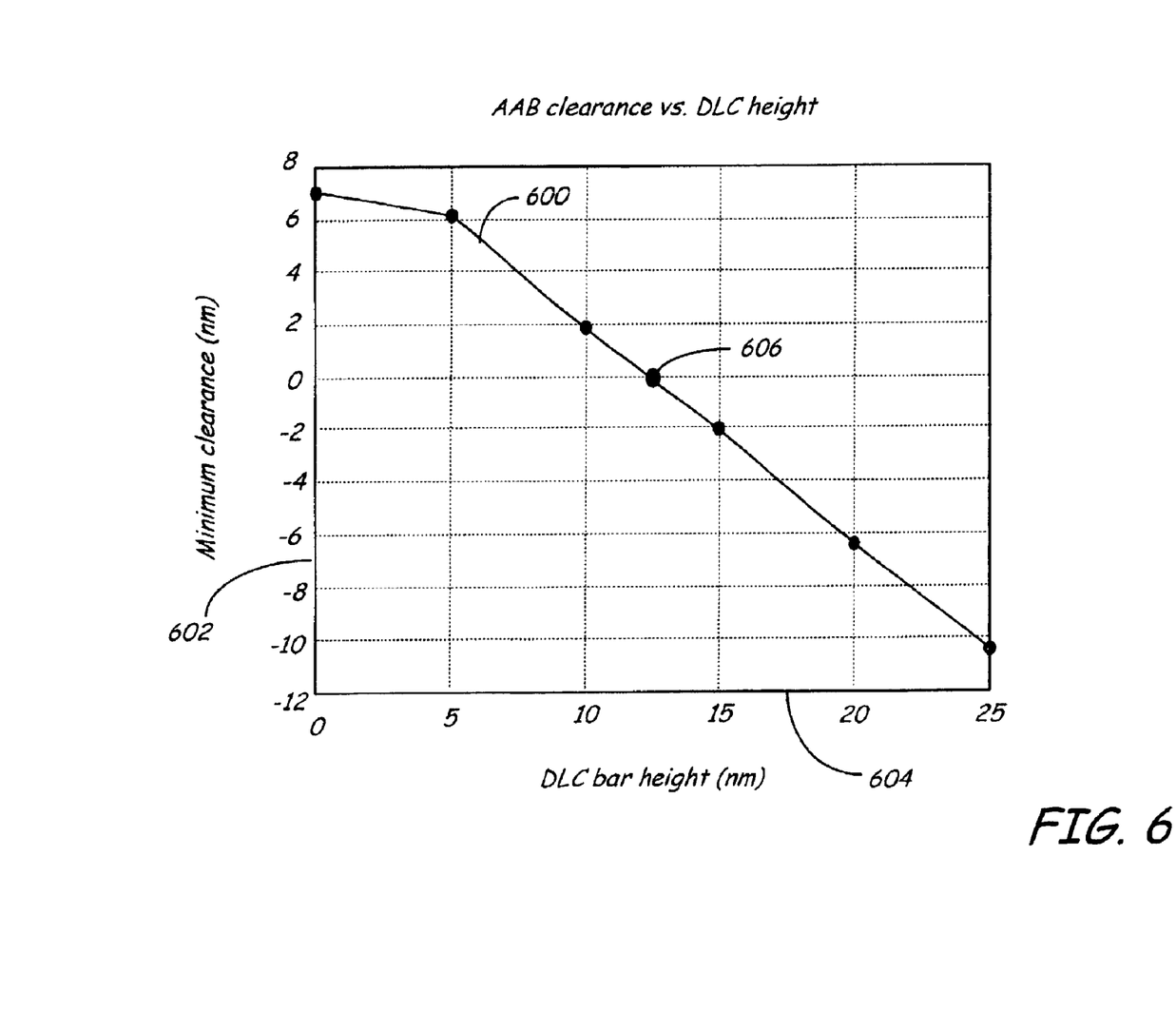
FIG. 6 is a graph of a response curve of the slider in FIG. 2.

FIG. 6 shows the minimum clearance of a slider 110 from the disc surface as a function of the height of one of the airflow-blocking pad. Vertical axis 602 represents the minimum clearance of slider 110, and horizontal axis 604 represents the height of the airflow-blocking pad, both in nanometers. Curve 600 shows that slider clearance increases as the height of the pad decreases. Assuming a perfectly flat disc surface, the pad wears asymptotically towards point 606. Point 606 on curve 600 is the point at which the minimum clearance for slider 110 is zero.

In one embodiment, airflow-blocking pads 220, 222, 224, 226 and 228 have dimensions and locations relative to pressurization areas 236 such that the following relation is true:

$$\frac{\Delta F}{\Delta H} \leq -0.001 \text{ gmF/nm} \quad \text{Equation 1}$$

where ΔF is the change in the pressurization force over one of the positive pressure areas 236, ΔH is the change in the height of the respective airflow-blocking pad 220, 222, 224, 226 or 228, both over a known period of time and gmF/nm is a gram force per nanometer. A traditional DLC pad has a much lower effect on pressurization.

Figure 7:
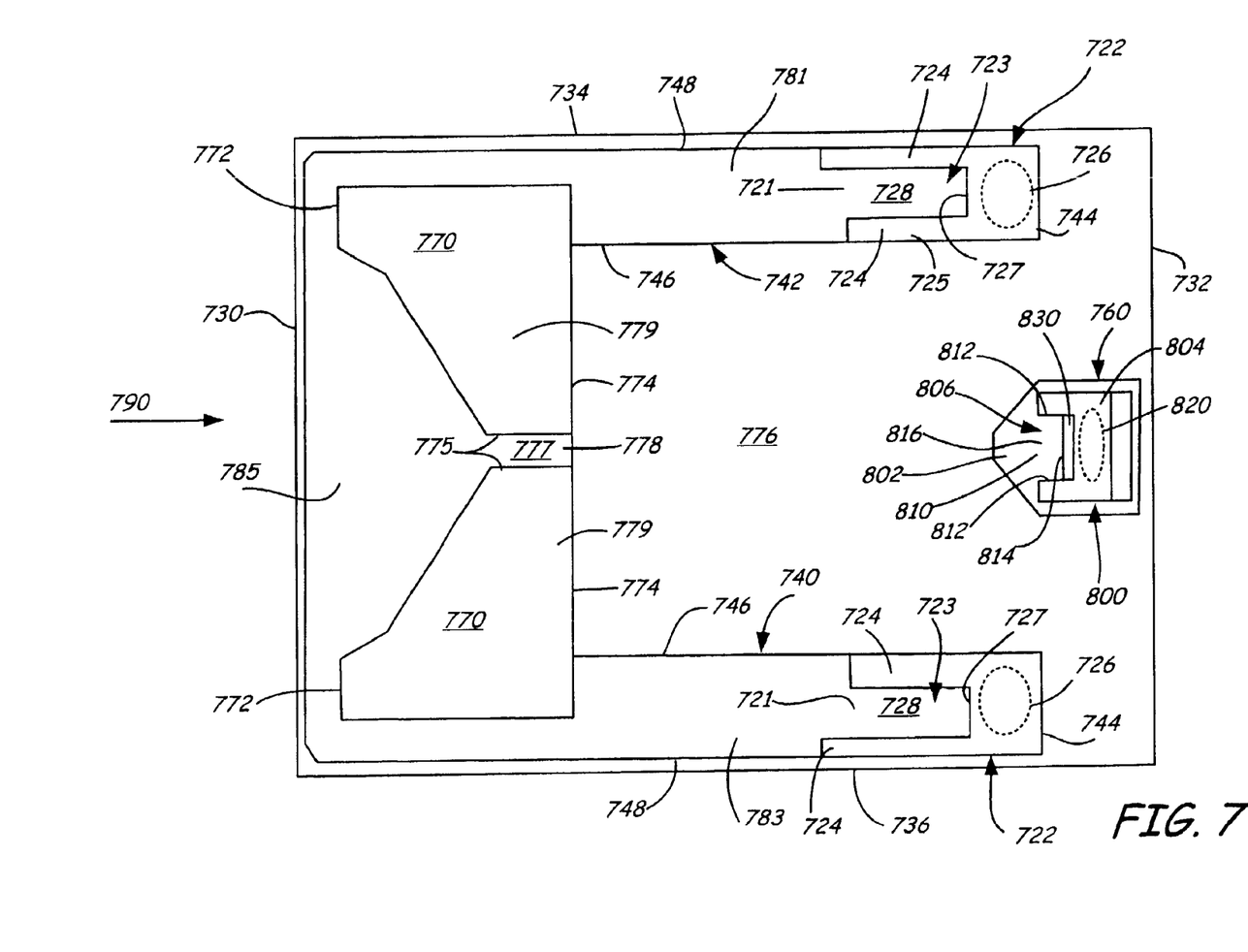
FIG. 7 is a bottom plan view of a slider in accordance with one alternative embodiment of the present invention.

FIG. 7 is a bottom plan view of a slider 700 in accordance with an alternative embodiment of the present invention. Slider 110 has a slider leading edge 730, a slider trailing edge 732, raised side rails 740 and 742, a center rail 760, a cavity dam 770 and a subambient pressure cavity 776. Slider side rails 740 and 742 are positioned along side edges 734 and 736, respectively. Rails 740 and 742 extend generally from leading slider edge 730 towards trailing slider edge 732. Each rail 740 and 742 has a trailing rail edge 744, an inside rail edge 746 and an outside rail edge 748. Rails 740 and 742 have recessed areas 781 and 783, respectively, which are recessed from cavity dam 770 by a step depth of 0.1 micrometers (μm) to 0.3 μm, for example and raised from subambient pressure cavity 776. Other depths can also be used. Pressurization features 722 are located on rails 740 and 742 near the trailing rail edges 744. Pressurization features 722 each have a bearing surface 725 which is raised from recessed areas 781 and 783. Pressurization feature 722 has a convergent channel 723 with a leading channel end 721, which is open to fluid flow from a respectable recessed area 781 or 783, channel walls 724, a trailing channel end 727, which is closed to the fluid flow, and a channel floor 728. Bearing surfaces 725 have localized positive pressure areas 726 rearward of channel trailing ends.

Cavity dam 770 extends between side rails 740 and 742, along leading slider edge 730. Cavity dam 770 further includes an upper surface 779, which defines a portion of the overall bearing surface for slider 710. Cavity dam 770 has a leading edge 772 and a trailing edge 774. Upper surface 779 of cavity dam 770 is divided into two surfaces by inlet channel 777. Inlet channel 777 is recessed in cavity dam 770 and has an inlet channel floor 778 and side walls 775.

Cavity dam 770 and side rails 740 and 742 define subambient pressure cavity 776, which trails the cavity dam 770 relative to a direction of air flow (shown as arrow 790) from leading slider edge 730 to trailing slider edge 732. Subambient pressure cavity 776 is recessed from the upper surfaces 779 of cavity dam 770 by a "cavity depth" of 1 μm to 3 μm, for example. Again, other depths can also be used. A leading step surface 785 extends along leading slider edge 730, forward of leading edge 772 of cavity dam 770. Leading step surface 785 and inlet 777 are recessed from the upper surfaces 779 of cavity dam 770 by the step depth, for example.

Center rail 760 has a pressurization feature 800 and a leading step surface 802. In one embodiment, pressurization feature 800 has an upper surface 804 that is generally coplanar with the upper surfaces 725 of pressurization features 722 on side rails 740 and 742. Leading step surface 802 is recessed from upper surface 804 by the step depth, for example, and is raised from cavity 776. A convergent channel feature 806 is recessed within pressurization feature 800 and has a leading channel end 810, which is open to fluid flow from cavity 776, channel side walls 812, a trailing channel end 814, which is closed to the fluid flow, and a channel floor 816. A localized positive pressure area 820 is generated by channel 806 at a location that is rearward of trailing channel end 814 and just forward of trailing slider edge 732. An airflow-blocking pad 830 is placed slightly upstream from localized positive pressure area 820 so as to block substantially all of the local fluid flow from reaching pressurization area 820 during the initial disc spin-up. In the example shown in FIG. 7, airflow-blocking pad 830 is formed on channel floor 816. However, airflow-blocking pad 830 can be formed on other surfaces, such as upper surface 804. Airflow-blocking pad 830 extends vertically beyond upper surface 804 towards the disc surface and has a first height relative to upper surface 804 in an initial state, prior to the break-in period of the disc drive. During the break-in period of the disc drive, pad 830 wears to a second, lower height in a similar manner as was discussed above with respect to the pads shown in FIGS. 3 and 4.

As airflow-blocking pad 830 wears, an increasing amount of the fluid flow reaches pressurization area 820 resulting in an increase in the pressurization of slider 700, which in-turn increases the flying height the slider until the slider no longer contacts the disc surface. The increased pressurization further acts to reduce the rate at which the airflow-blocking pad wears. Airflow-blocking pad 830 continues to wear at a reducing rate until the wear rate reaches zero. Thus, an asymptotic, critical equilibrium state is reached in which the wear rate equals zero and slider 700 flies in close proximity to the disc surface at the desired flying height. After the break-in period, pad 830 has the second, lower height relative to upper surface 804 during the normal operating state of the disc drive.

Airflow-blocking pads can also be used on a variety of other types of sliders having a variety of different bearing surface geometries. The geometries shown in FIGS. 2, 3, 4 and 7 are provided as examples only. Also, the blocking pads can have a variety of shapes, sizes and locations, as long as the pads initially block airflow to one or more key pressurization features on the slider and are designed to burnish to a lower height during normal disc drive operation. For example, the key pressurization areas do not need to have convergent channels as shown in the above FIGS. A simple rectangular or otherwise-shaped bearing pad can be preceded by an upstream airflow-blocking pad in accordance with an alternative embodiment of the present invention. Also, the airflow-blocking pads can be formed on areas of the slider other than the center rail, such as on the side rails.

In summary, the head slider (110, 700) of the present invention includes a slider body having a media opposing face with a leading slider edge (130, 730), a trailing slider edge (132, 732), a recessed area (176, 776) and a bearing surface (162, 804) formed by at least one pressurization feature (210, 212, 214, 216, 218, 800). The pressurization feature (210, 212, 214, 216, 218, 800) comprises an upper surface (162, 804), which is raised relative to the recessed area (176, 776). A wearable airflow-blocking pad (220, 222, 224, 226, 228, 830) is positioned on the media-opposing face upstream of the positive pressurization area (236, 820), and between the positive pressurization area (236, 820) and the recessed area (176, 776). The upper surface of the airflow-blocking pad (220, 222, 224, 226, 228, 830) is wearable from a first height to a second lower height relative to the upper surface (162, 804) of the pressurization feature (210, 212, 214, 216, 218, 800) during normal operations of the data storage system. The airflow blocking pad (220, 222, 224, 226, 228, 830) is located on the media opposing face and has a dimension such that the pad (220, 222, 224, 226, 228, 830) substantially disrupts the fluid flow from reaching the positive pressurization area (236, 820) when at the first height, and allows a progressively increasing fluid flow to reach the positive pressurization area (236, 820) as the pad (220, 222, 224, 226, 228, 830) wears towards the second height.

A second embodiment of the present invention is directed towards a disc drive (100). The disc drive (100) has a data storage disc (107), a suspension (112), and a slider (110, 700). The slider (110, 700) is supported by the suspension (112) and has a slider body, a leading slider edge (130, 730), a trailing slider edge (132, 732), a recessed area (176, 776), and a positive pressurization are (236, 820) formed on the media opposing face. A wearable airflow blocking pad (220, 222, 224, 226, 228, 830) is disposed upstream from the positive pressurization area (236, 820) where the airflow blocking pad (220, 222, 224, 226, 228, 830) substantially blocks the fluid flow from pressurizing the positive pressurization area (236, 820) when the wearable pad (220, 222, 224, 226, 228, 830) is at the first height. The airflow-blocking pad (220, 222, 224, 226, 228, 830) is in contact with the disc (107) and allows progressively increasing fluid flow to pressurize the positive pressurization area (236, 820) as the pad (220, 222, 224, 226, 228, 830) wears towards the second height.

A third embodiment of the present invention is directed towards a method of adjusting the fly height of a head slider (110, 700) relative to a moving media (107). First, the slider (110, 700), which has a media opposing face, a positive pressurization area (236, 820) on the media opposing face, and a recessed area (176, 776), is supported relative to the media (107). Second, the media (107) is moved relative to the slider (110, 700) causing fluid flow along the media opposing face. Third, an airflow-blocking pad (220, 222, 224, 226, 228, 830) disposed on the media opposing face blocks the fluid flow from reaching and providing any substantial pressurization of the positive pressurization surface (236, 820). The airflow-blocking pad (220, 222, 224, 226, 228, 830) has a first height relative to the positive pressurization surface (236, 820), such that the airflow-blocking pad (220, 222, 224, 226, 228, 830) contacts the media (107) as the media (107) moves relative to the slider (110, 700). Fourth, burnishing the airflow-blocking pad (220, 222, 224, 226, 228, 830) as the pad (220, 222, 224, 226, 228, 830) contacts the media (107) such that the pad (220, 222, 224, 226, 228, 830) wears from the first height toward a second, lower height. As the pad (220, 222, 224, 226, 228, 830) wears from the first height, the fluid flow to the positive pressurization surface (236, 820) progressively increases, thereby decreasing a rate of the burnishing toward zero as the airflow-blocking pad (220, 222, 224, 226, 228, 830) approaches the second height.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the disc drive system while maintaining substantially the same functionality without departing from the scope and spirit of the present invention. In addition, although the preferred embodiments described herein is directed to a subambient pressure slider, it will be appreciated by those skilled in the art that the teachings of the present invention can be applied to positive pressure slider with no subambient pressure cavity, without departing from the scope and spirit of the present invention.

What is claimed is:

1. A head slider for supporting a transducer relative to a moving media in a data storage system, the slider comprising:

a slider body having a media opposing face with a leading slider edge, a trailing slider edge, a recessed area and a bearing surface formed by at least one pressurization feature, wherein the pressurization feature comprises an upper surface with a positive pressurization area which is raised relative to the recessed area; and a wearable airflow-blocking pad positioned on the media opposing face, upstream of the positive pressurization area, between the positive pressurization area and the recessed area, and having an upper surface that is wearable from a first height to a second, lower height relative to the upper surface of the pressurization feature during normal operation of the data storage system, wherein the airflow-blocking pad has a location on the media-opposing face and a dimension such that the pad substantially disrupts fluid flow from reaching the positive pressurization area when at the first height and allows progressively increasing fluid flow to reach the positive pressurization area as the pad wears toward the second height.

2. The head slider of claim 1 wherein the airflow-blocking pad is formed of a different material than the slider body.

3. The head slider of claim 2 wherein the airflow-blocking pad comprises diamond-like carbon.

4. The head slider of claim 1 wherein the airflow-blocking pad has a width transverse to the fluid flow that is at least 50 percent of a width of the entire positive pressurization area.

5. The head slider of claim 1 wherein the airflow-blocking pad has a width transverse to the fluid flow that is at least 75 percent of a width of the entire positive pressurization area.

6. The head slider of claim 1 wherein the airflow-blocking pad has a width transverse to the fluid flow that is at least 85 percent of a width of the entire positive pressurization area.

7. The head slider of claim 1 wherein the pressurization feature has a leading edge adjacent to the recessed area, and the airflow-blocking pad is positioned on the upper surface of the pressurization feature along the leading edge of the pressurization feature.

8. The head slider of claim 1 wherein the pressurization feature has a leading edge adjacent to the recessed area, and the airflow-blocking pad is positioned on the recessed area, along the leading edge of the pressurization feature.

9. The head slider of claim 1 wherein the first height of the airflow-blocking pad is at least 250 Angstroms.

10. The head slider of claim 1 wherein the location and dimension of the airflow blocking pad are such that the following relation is true:

$$\frac{\Delta F}{\Delta H} \leq -0.001 \text{ gmF/nm}$$

where ΔF is the change in pressurization force over the positive pressure area caused by fluid flow along the positive pressure area, between the positive pressure area and the moving media, and ΔH is the change in the height of the airflow-blocking pad as the pad wears from the first height toward the second height.

11. The head slider of claim 1 wherein the media opposing face further comprises:
   a first rail disposed between the leading slider edge and the trailing slider edge, along a first side edge of the media-opposing face;
   a second rail disposed between the leading slider edge and the trailing slider edge, along a second side edge of the media-opposing face, wherein the recessed area is disposed between the first and second rails; and
   a center rail disposed along the trailing slider edge, downstream of the recessed area, wherein the pressurization feature is disposed on the center rail.

12. The head slider of claim 11 wherein the media-opposing face further comprises a cavity dam disposed along the leading slider edge, upstream of the recessed area such that the recessed area forms a subambient pressure cavity.

13. The head slider of claim 1 wherein the pressurization feature is horseshoe-shaped.

14. The head slider of claim 1 wherein the pressurization feature comprises a convergent channel, which is recessed within the upper surface and has a leading channel end, which is open to fluid flow from the recessed area, channel side walls, and a trailing channel end, which is closed to the fluid flow and upstream of the positive pressurization area, and wherein the airflow-blocking pad is positioned between the trailing channel end and the positive pressurization area.

15. The head slider of claim 1 wherein the positive pressurization area is a discrete area that is isolated from other positive pressurization areas on the media opposing face and the airflow-blocking pad blocks substantially all of the fluid flow from the recessed area from pressurizing any significant portion of the positive pressure area when the airflow-blocking pad has the first height.

16. A disc drive comprising:
   a data storage disc, which is rotatable about a central axis;
   a suspension; and
   a slider, which is supported by the suspension relative to the data storage disc and comprises:
      a slider body having a disc opposing face with a leading edge and a trailing edge relative to a direction of rotation of the data storage disc;
      a recessed area formed on the media opposing face;
      a positive pressurization area formed on the media opposing face, downstream of the recessed area, wherein the positive pressurization area is raised relative to the recessed area; and
      an airflow-blocking pad disposed upstream from the positive pressurization area, wherein the airflow-blocking pad is wearable from a first height to a second, lower height relative to the positive pressurization area during normal rotation of the data storage disc, wherein the airflow-blocking pad substantially blocks fluid flow from pressurizing the positive pressurization area when at the first height, causing contact between the airflow-blocking pad and the disc, and wherein the airflow-blocking pad allows progressively increasing fluid flow to reach and pressurize the positive pressurization area as the pad wears toward the second height due to the contact.

17. The disc drive of claim 16 wherein the airflow-blocking pad is formed of a different material than the slider body.

18. The disc drive of claim 16 wherein the airflow-blocking pad has a width transverse to the fluid flow that is at least 75 percent of a width of the entire positive pressurization area.

19. The disc drive of claim 16 wherein the positive pressurization area has a leading edge adjacent to the recessed area, and the airflow-blocking pad is positioned along the leading edge of the positive pressurization area.

20. The disc drive of claim 16 wherein the airflow blocking pad has a location and dimension relative to the positive pressurization area such that the following relation is true:

$$\frac{\Delta F}{\Delta H} \leq -0.001 \text{ gmF/nm}$$

where ΔF is the change in pressurization force over the positive pressure area caused by fluid flow between the positive pressure area and the data storage disc, and ΔH is the change in the height of the airflow-blocking pad as the pad wears from the first height toward the second height.

21. The disc drive of claim 16 wherein the slider further comprises a convergent channel, which has a leading channel end, which is open to fluid flow from the recessed area, channel side walls, and a trailing channel end, which is closed to the fluid flow and upstream of the positive pressurization area, and wherein the airflow-blocking pad is positioned between the trailing channel end and the positive pressurization area.

22. The disc drive of claim 16 wherein the positive pressurization area is a discrete area that is isolated from other positive pressurization areas on the media opposing face and the airflow-blocking pad blocks substantially all of the fluid flow from the recessed area from pressurizing any significant portion of the positive pressure area when the airflow-blocking pad has the first height.

23. A method for adjusting the fly height of a head slider relative to a moving media, the method comprising:
   supporting the slider relative to the media, wherein the slider has a media opposing face, a positive pressurization surface disposed on the media opposing face, and a recessed area formed within the media opposing face upstream of the positive pressurization surface, which is recessed from the positive pressurization surface;
   moving the media relative to the slider causing fluid flow along the media opposing face;
   blocking the fluid flow from reaching and providing any substantial pressurization of the positive pressurization surface with an airflow-blocking pad, which is disposed on the media opposing face and has a first height relative to the positive pressurization surface, such that the airflow-blocking pad contacts the media as the media moves relative to the slider; and
   burnishing the airflow-blocking pad as the pad contacts the media such that the pad wears from the first height toward a second, lower height and the fluid flow to the positive pressurization surface progressively increases, thereby decreasing a rate of the burnishing toward zero as the airflow-blocking pad approaches the second height.

* * * * *